J. A. BURGESS.
SOUND DETECTOR.
APPLICATION FILED JUNE 8, 1917.

1,301,034.

Patented Apr. 15, 1919.
5 SHEETS—SHEET 1.

INVENTOR:
John A. Burgess,
ATTYS.

J. A. BURGESS.
SOUND DETECTOR.
APPLICATION FILED JUNE 8, 1917.

1,301,034.

Patented Apr. 15, 1919.
5 SHEETS—SHEET 3.

INVENTOR:
John A. Burgess,
BY
ATTYS.

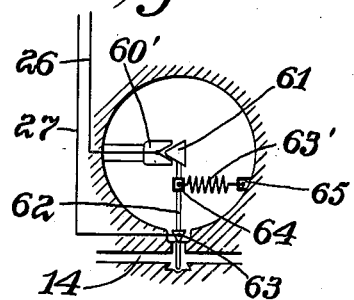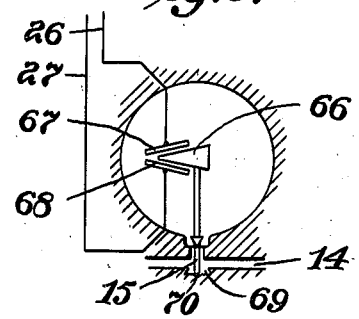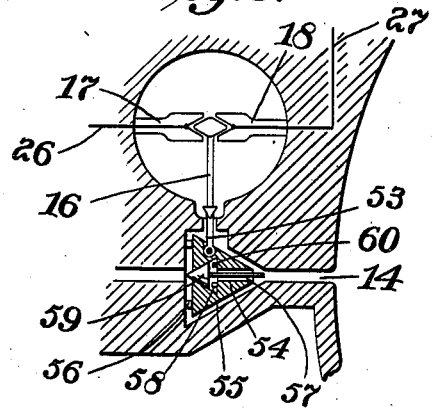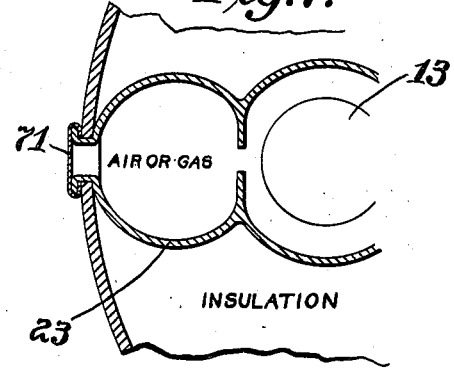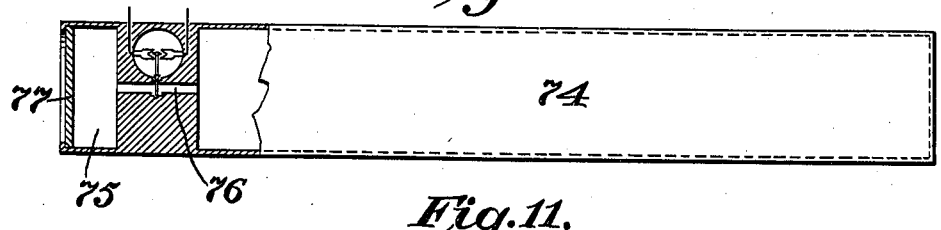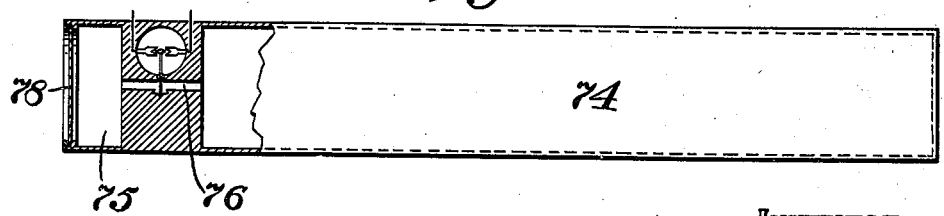

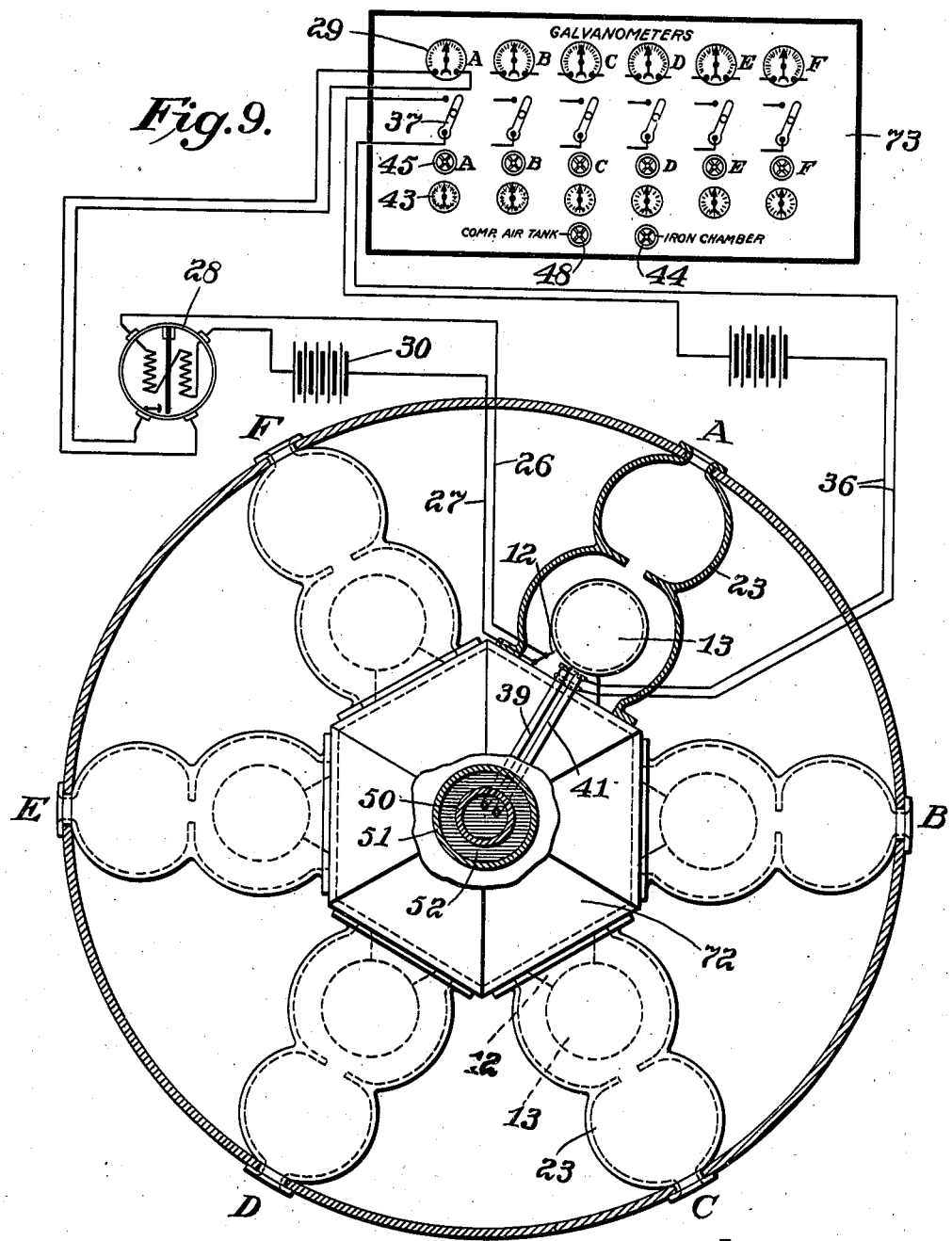

UNITED STATES PATENT OFFICE.

JOHN A. BURGESS, OF TORONTO, ONTARIO, CANADA, ASSIGNOR OF ONE-HALF TO GEORGE B. HUTCHINGS, OF RICHMOND, VIRGINIA.

SOUND-DETECTOR.

1,301,034.   Specification of Letters Patent.   Patented Apr. 15, 1919.

Application filed June 8, 1917. Serial No. 173,584.

*To all whom it may concern:*

Be it known that I, JOHN ARMSTRONG BURGESS, a citizen of the Dominion of Canada, residing at Toronto, Ontario, Canada, have invented new and useful Improvements in Sound-Detectors, of which the following is a specification.

This invention relates to devices for detecting the presence of characteristic sounds and the principal object of the device is to indicate the presence of submarines.

With the present muffling of enemy submarines to hinder if not completely prevent the detection of their presence by the microphones at present in use and the use of screw propellers to further lessen the production of sound, it becomes necessary to devise a detector that will be sensitive to sound in the inaudible scale, the production of which no amount of muffling can overcome. Such a detector forms the basis of this invention but I do not intend to limit myself to the detection of marine sounds, or sounds in the inaudible scale for the device may be made responsive to or operable by any predetermined sound inaudible sounds having only been mentioned as being the most productive of results so far as the detection of submarines goes. Likewise I do not mean to limit myself to the use of the devices of this invention for they may be used as a weighing balance, having an accuracy and delicateness such as has never been known before.

The invention also has possible uses in telephony, wireless telegraphy geophony etc.

The operation of the invention is based upon the difference in pressure between the condensation and rarefaction areas of a sound wave. The areas of condensation are more dense than normally and contrariwise the areas of rarefaction are less dense than normally. I have found that any body immersed in or enveloped by a condensation area will be subjected to increased pressure so that its molecules will be moved closer together, resulting in a shortening (or other deformation) of the body. When immersed in a rarefaction area the body will be subjected to a less than normal pressure so that its molecules will move farther apart resulting in a lengthening (or other alternate deformation) of the body. Therefore, a body having a diameter or length less than half a wave length of a sound will be alternately deformed as the succeeding areas of condensation and rarefaction of the progressing sound wave envelop it. To restate this important principle: the different areas of the sound wave cause an alternating movement of the molecules of any body exposed to such areas and this molecular movement results in the deformation of the body, which deformation may take the form of a change of some one dimension of the body or all of its dimensions, its volume, or its density, depending upon the nature or shape of the body and the degree of pressure it is under. To put it still another way: the deformation of the body is the resultant of the combined amplitudes of oscillation of the molecules contained within the body.

The invention is illustrated in the accompanying drawings, in which,

Figs. 4, 5 and 6 show modified forms of the details shown in Fig. 3.

Fig. 7 shows a diaphragm for excluding the water from the resonator, if desired.

Fig. 9 shows a compound arrangement of the device.

Figs. 10 and 11 show modified forms of the device.

Figure 1:
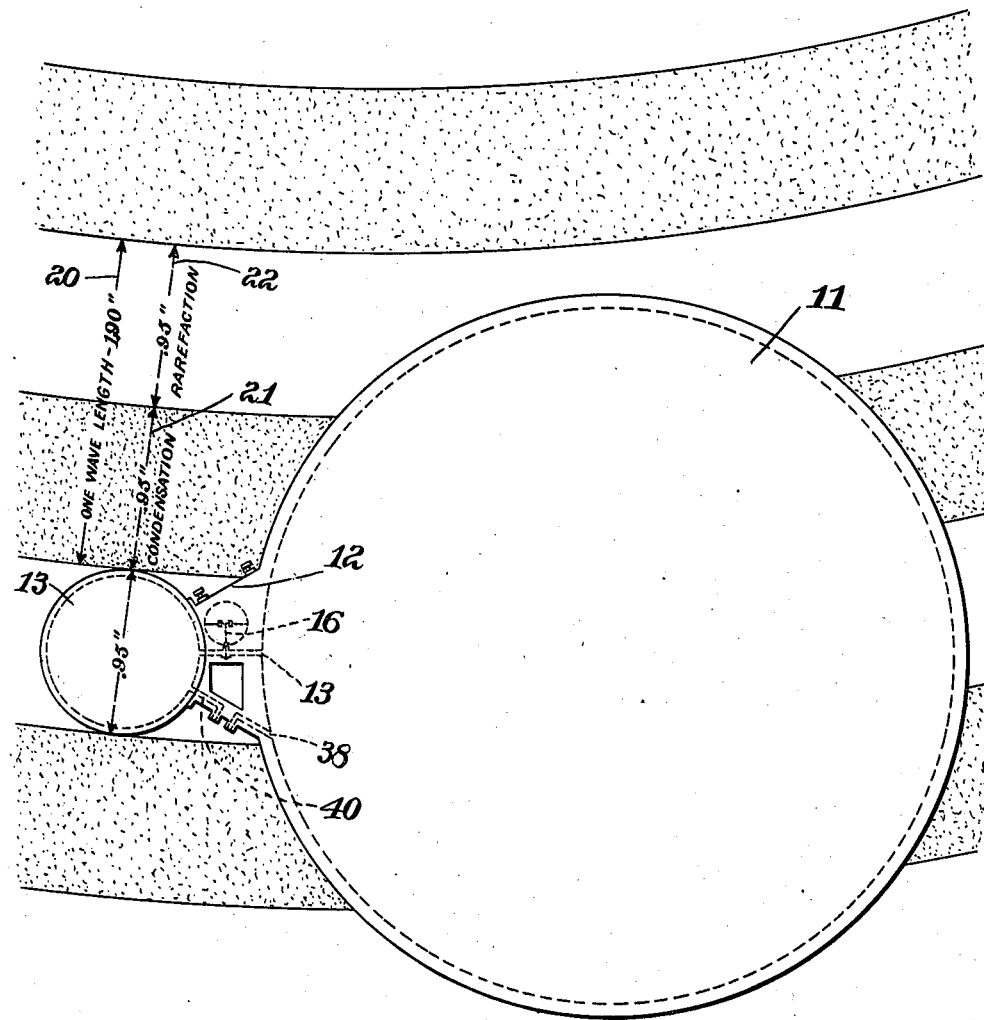
Figure 1 is an elementary showing of the principle on which the device operates.

In the drawings the numeral 11 indicates a rigid hollow receptacle, of any suitable shape and material, for the storing of a gas, such as air. This sphere 11 carries a superstructure 12 surmounted by a resilient hollow body or ball 13. 14 represents a duct leading through the superstructure 12 from the ball 13 to the sphere 11. Located in the duct 14 is the bladed end 15 of a lever, having a long arm 16 co-acting with two electric terminals 17 and 18. 19 indicates an aperture in the superstructure in which are located the elements 16, 17 and 18.

A wave length of the sound to be received is represented by 20, which comprises a condensation portion 21 and a rarefaction portion 22 and as it will be assumed that the sound to be received has 30,000 vibrations per second, the wave length is shown substantially full size. The ball 13 in theory will have a diameter one-half the wave length of the sound to be received, but in practice it must be less than one-half wave length whereby the areas of condensations 21 and rarefactions 22 in progressing will alternately completely envelop the ball 13. In the condition shown in Fig. 1, wherein the ball is enveloped by an area of rarefaction, the pressure on the ball is less than normal, due to the lessened density of the areas of rarefaction and it will expand. This will draw gas from the sphere 11 through the duct 14 into the ball. Such movement of gas through the duct 14 will impinge upon the blade 15, which will move the long arm 16 of the pivoted lever nearer to the terminal 18 and away from the terminal 17. This varies the intensity of the current flowing continuously between these terminals. With the use of well known electrical means this motion can be magnified to indicate to the operator when such motion takes place.

As the area of rarefaction passes and is followed by one of condensation, the pressure on the ball becomes more than normal due to the increased density of the areas of condensation and it will be compressed. This will force the excess gas previously drawn in from the sphere 11 back thereinto through the duct 14. Such movement acts upon the blade 15 in the opposite direction to that above described, so that the lever is returned to initial position.

Figure 2:
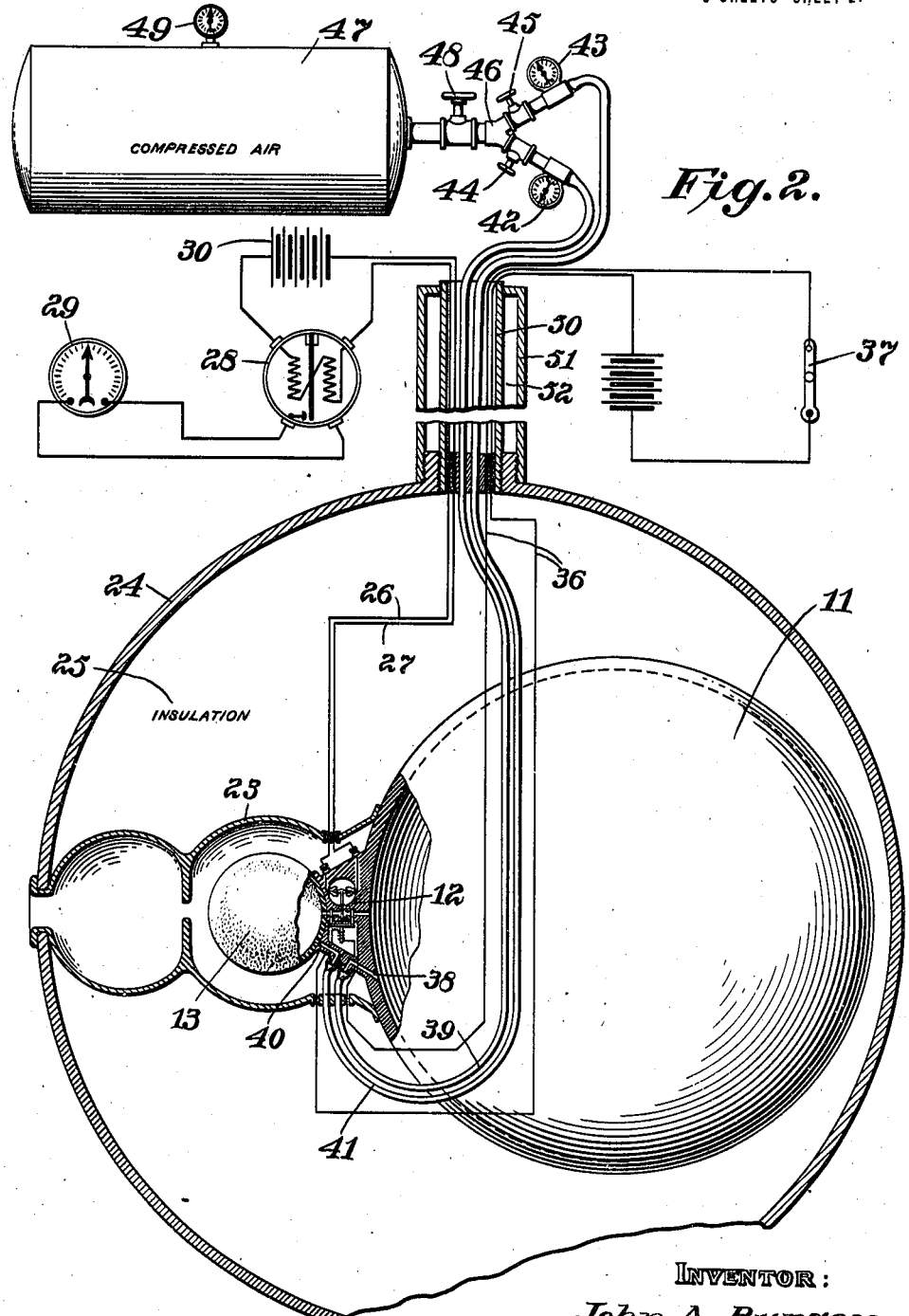
Fig. 2 shows a completed single device with its co-acting circuits and attachments.
Figure 8:
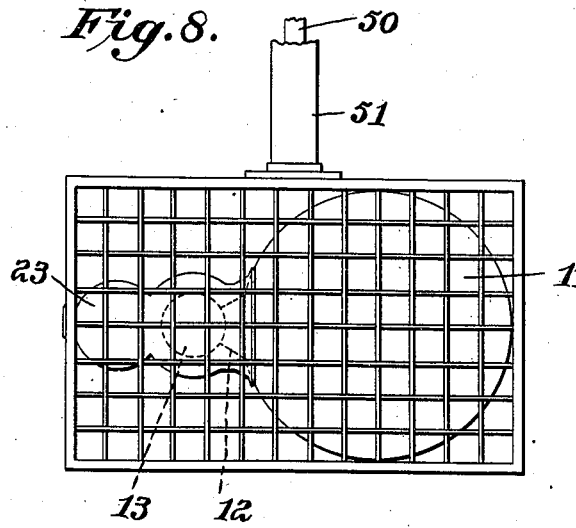
Fig. 8 shows a modified form of container of the device.

Referring now to the more complete embodiments of the invention, as shown in Fig. 2, the sphere 11 carries a Helmholtz selective resonator 23 having one of its chambers inclosing the ball 13. This resonator will be one for selecting out a sound having the wave length by which it is assumed that the device will be operated—30,000 vibrations. Such a resonator naturally will not select out that wave length alone but it will intensify its own sound above the others. The sphere, ball and resonator are then inclosed in either a protective casing 24 or a grating, as shown in Fig. 8. The space between the casing and detector is insulated with any desired material 25, such as cork or a hydrogen vacuum. In this embodiment, the terminals 17 and 18 are connected to wires 26 and 27 in which circuit an audion 28 may be located, together with a galvanometer 29 or any other similar indicating device either audible or visual. 30 indicates a battery in the circuit.

Figure 3:
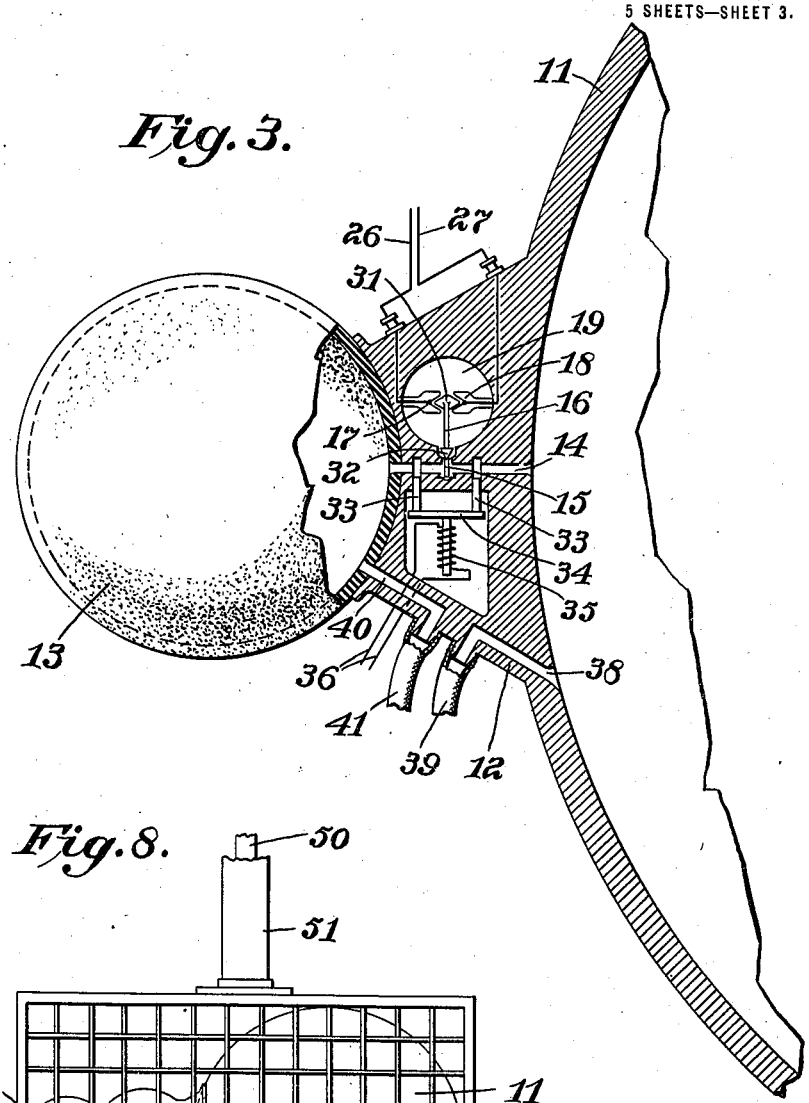
Fig. 3 is an enlarged detail view through the superstructure of the metal reservoir.

Referring to the enlarged showing of the construction of the superstructure 12 in Fig. 3, the terminals 17 and 18 are inverted cone or cup-shaped and made of carbon to prevent lag. 31 indicates a carbon connecting head carried by the lever arm 16 but, insulated therefrom, of the shape of two cones to make good contact with the terminals 17 and 18. 32 indicates knife pivots for the lever. The duct 14 may be closed off by means of gates 33 yoked together by 34 and operated by a solenoid 35 in a circuit 36 controlled by an operator's switch 37. 38 represents a passage from the sphere 11 to which is connected a tube or hose 39, and, 40, represents a similar passage from the ball 13 connected to a tube 41. Returning to the showing in Fig. 2 the tubes 39 and 41 continue upwardly to the ship from which the device is suspended where they are supplied with pressure gages 42 and 43 respectively and valves 44 and 45 respectively. 46 represents a coupling connecting the two tubes which is connected to a source of compressed air or gas 47 whose outlet is controlled by a valve 48. 49 indicates a pressure gage on the air tank. The detector is suspended from the ship by means of a pipe 50 adapted to house the electrical and tubular connections. It is surrounded by a further pipe 51 spaced therefrom and the space therebetween filled with sound insulation 52, such as a hydrogen vacuum.

The form of lever and blade may be modified as shown in Fig. 6 in which the short lever arm 53 is pivotally connected to a conical valve 54 slidably operating in a recess 55 in the duct 14. Pins 56 are provided, as indicated, to prevent the valve 54 from seating completely when air is passing into the ball. This valve is provided with a passage 57 provided with a conical enlargement 58 in which operates a supplementary cone valve 59 oppositely directed from the main valve 54. Pins 60 are provided to prevent this valve from seating when air is passing into the sphere 11. Movement of air into the sphere 11 first seats the main valve 54 on its coned seat, the movement of which valve moves the lever 16 to vary the intensity of the current continuously passing between the terminals 17 and 18, as before described. Continued flow of air unseats the small cone 59, so that air can pass around it and through the passage 57 to the duct 14. Change of direction of flow of the air from the sphere to the ball will first seat the small cone 59 and then move the main valve to the position shown. This will move the lever to contact with the opposite terminal and the excess air will flow around the valve 54 to the duct 14. The blade of the arm 15 may be made of some slightly resilient material or else of stiff material having a resilient disk located in it so that any unusual pressure of gas in the duct 14 would be compensated for by the resilient member, therefore preventing damage to the parts.

In the modifications shown in Figs. 4 and 5, instead of having a current flow continuously through the terminals 17 and 18 with movement of the lever only operating to vary the intensity of the current, the flow of current is broken. In Fig. 4 the circuit is made through the terminal 60; the lever head 61, the long lever arm 62, the pivot 63 to the return wire 27. A spring 63' having carbon insulating elements 64 and 65 is provided to return the lever to initial position upon cessation of air flow in the duct 14. In Fig. 5, the lever head 66 engages two spring shoe terminals 67 and 68 and the varying contact of the head upon the shoes upon pivotal movement thereof will vary the intensity of the current passing through the terminals and if the pivotal movement is great enough will break the circuit.

69 indicates an enlargement in the duct 14 so that the blade 15 will have an area greater than that of the duct 14 and 70 indicates a by-pass around the blade so that any undue flow of air may escape and not insure the lever.

Instead of having water enter the resonator 23 and envelop the ball 13 as shown in Fig. 2, a diaphragm 71 may be placed over the mouth of the resonator as shown in Fig. 7.

The operation of the device of Fig. 2 and its modifications is as follows: The operators on the ship will first determine the depth below the surface the detector will be used. Ordinarily ten feet below will be used but conditions may vary this. Assuming, however, ten feet is to be used, the pressure of water ten feet below the surface is determined and then that exact pressure is produced in the ball 13 and the sphere 11 by means of the air tank 47 and the tubes 39 and 41, the gauges 42 and 43 indicating the exact pressures in each. With the pressures in the ball and sphere equal to each other and to the outside thereof, the air in each will be at rest with no movement whatever in the duct 14. When the detector is out of water and particularly when pressure is being led to the ball and sphere the switch 37 is opened so that the gates 33 close off the lever blade 15 from any pressure. After the detector has reached its predetermined depth, switch 37 is closed whereby the gates 33 are opened and the device is ready for work.

If, after submergence, a greater or less depth of the detector is desired the pressures in the ball and sphere can readily be changed by means of the valves 44, 45 and 48 without requiring the detector to be brought to the surface.

As only the characteristic sound wave sent out by the source of sound desired to be detected can get into the resonator 23 to become effective upon the ball 13, in the absence of such sounds, the lever remains at rest, the current flow through the terminals 17 and 18 remains constant and the galvanometer 29 or other visible or audible indicating device remains stationary or dead. However, if the sound source to be detected is in or comes into the vicinity of the detector, its peculiarly characteristic sounds enter the resonator 23, become effective upon the ball 13, which in turn causes vibrations of the lever, whereby the intensity of the current through the terminals 17 and 18 is varied and the galvanometer 29 by its movement shows the operator. While the device has been thoroughly insulated it is not pretended that a mechanical blow thereon will not affect the delicate mechanism thereof but such a blow could not deceive the operator into mistaking the movement of the galvanometer needle thereby for movement due to sound, because in the case of sound being received the vibration of the needle is continuous as compared with its vibration, due to a blow on the device.

In the arrangement shown in Fig. 9 the construction of the detector parts is the same as shown in Fig. 2 but instead of having only one ball and resonator, a plurality are used. Instead of the sphere 11 the main chamber 72 is formed hexagonal in cross section for convenience and the six faces each carry a resilient ball 13 with a superstructure 12, and parts as shown in Fig. 2 and a resonator 23. The connections of the ball are the same here as in Fig. 2, but the galvanometers, switches, valves, etc., are conveniently arranged on a switch board 73.

The resonator and its ball marked A will be arranged to correspond to a sound of 30,000 vibrations per second; the set marked B to respond to 40,000; the set C to 50,000 etc. As warships, merchant ships and submarines give out different characteristic sound waves the set F could be made to receive warship waves only and the set E, merchant ship waves only, but as different classes of submarines also give out characteristic sound waves, the set A will receive waves from enemy submarines class U only; set B, class UB only, set C, class UC only, etc. The operation of equalizing the pressures in the balls and sphere with the surrounding water, and submergence of the device is the same as in the simple device of Fig. 2, the only difference being that this is a compound device. The operator then watches the galvanometers on his switchboard. If galvanometer F begins to vibrate, he knows the resonator and ball in set F is receiving sound and as that set is only attuned to warship vibrations, a warship is within hearing distance of the detector. If, however, galvanometer A vibrates, then he will know an enemy submarine of class U is in the vicinity with which knowledge a suitable locator could be used to locate the boat. Similarly operation of the other galvanometers would tell their story to the operator.

In the modified forms of Figs. 10 and 11, the sphere and ball are replaced by a cylinder having a main reservoir portion 74 and a compression chamber 75 connected by a duct 76 similar to the duct 14 with its lever, 77 is a disk or piston closing the end of the cylinder upon which the condensation and rarefaction areas operate to cause compression and expansion in the chamber 75 which corresponds to the ball 13. In Fig. 11 the disk 77 of Fig. 10 is merely replaced by a flexible skin or diaphragm 78.

Whereas, characteristic waves have been referred to, beats could be used without departing from the spirit of the invention.

Devices made in accordance with this invention have been found to be responsive only to true sound, so that they are fully operative at the maximum speed of the carrying ship for they do not transmit or are not affected by tremble, shock or jar.

What I claim is:—

1. A method of sound detection consisting in varying molecular movement within a body by exposing the body to succeeding areas of condensation and rarefaction of a sound wave, and then using the sum of the variations of movement of the molecules within the body to indicate the presence of the sound.

2. A method of sound detection consisting in varying molecular movement within a body by exposing the body to succeeding areas of condensation and rarefaction of a sound wave, whereby the body is alternately deformed, and then using the deformations of the body to operate signaling means to indicate the presence of the sound.

3. A method of sound detection consisting in varying molecular movement within a body whose length or diameter is less than half the wave-length of the sound to be detected, by exposing the body to succeeding areas of condensation and rarefaction of the sound wave to be detected whereby the body is alternately deformed, and then using the deformations of the body to operate signaling means to indicate the presence of the sound to be detected.

4. A sound detector comprising a body whose molecules are moved toward and away from each other as areas of condensation and rarefaction of sound waves pass thereover, whereby the body is alternately contracted and expanded, and means operated by the changes of the body to indicate the presence of the sound.

5. The device of claim 4 in which the body is less in length or diameter than $\frac{1}{2}$ the wave length of the sound to be detected.

6. A sound detector comprising a resilient member, a non-resilient member, one being larger than the other, a connection between the members, and signaling means having a controlling element in said connection.

7. In a sound detector, an element less in width than a half wave length of the sound to be detected, and means for indicating the effect of the condensation and rarefaction areas of the sound wave on the element.

8. A device of the class described including a member deformable by areas of condensation and rarefaction of sound waves, a rigid member, a connecting passage between said members, a vibratory element in said passage and indicating means operated by said element.

9. A device of the class described including a hollow member deformable by areas of condensation and rarefaction of sound waves, a hollow rigid member, a connecting passage between said members, means for equalizing the pressures in the members with each other and the medium in which the device is to be used, a vibrating element in said passage, and indicating means operated by said element.

10. A device of the class described including a resilient member, a rigid member, a connecting passage between said members, an electric circuit, and a vibratory element in said passage adapted to vary the current flow in the circuit.

11. A device of the class described including a member deformable by areas of condensation and rarefaction of sound waves, a resonator coacting therewith and serving as a protecting casing for said deformable member, a rigid member, a connecting passage between said members, a vibrating element in said passage, a housing for elements enumerated, and sound insulating means between the elements and the housing whereby the rigid member may not be acted upon by the sound waves while the deformable member may be.

12. A sound detector comprising a body of gas and means operated by the effect of sound upon the gas to indicate the presence of the sound to be detected.

13. A sound detector including a body adapted to expand and contract due to molecular movement within the body when immersed in sound.

14. A sound detector including a body adapted to expand and contract due to molecular movement within the body when immersed in sound, and means for indicating the change of dimension of the body.

15. A sound detector including a body adapted to expand and contract when immersed in sound, and means including a lever for indicating the deformation of the body.

16. A method of sound detection consisting in causing molecular movement within a body to vary a dimension of a body by the sound to be detected, and then indicating the variance of the dimension of the body to show the presence of the sound.

17. A device comprising a body adapted to increase and decrease when immersed in sound, and means including a vibratory blade for indicating the changes of the body.

18. A device comprising a plurality of bodies of which one is large and one is small, the small one being less in size than one-half the wave length the sound to be detected and adapted to increase and decrease when immersed in sound, and an indicating system including a controlling element for said system located between said large and small members and operated by the changes of the small body.

19. A device comprising a hollow resilient member, a rigid member supporting said resilient member, a passage therebetween, a vibratory gate element in said passage, an indicating system operated by said gate and means for equalizing the pressure in the two members.

20. The device of claim 19 with means for equalizing the pressure in the two members with the pressure surrounding the members.

21. The device of claim 19 with means for controlling the amount of pressure in the members acting upon the gate element.

22. A device comprising an apertured hollow rubber ball adapted to have fluid drawn into and expelled therefrom as areas of condensation and rarefaction of a sound wave pass thereover, and indicating means operated by the passage of the fluid into and out of the ball to indicate the presence of the sound.

JOHN A. BURGESS.